J. E. CANNING.
TOOTH REGULATING DEVICE.
APPLICATION FILED MAR. 14, 1916.

1,202,797.

Patented Oct. 31, 1916.

Witnesses
Otto E. Hoddick.
John B. Wade.

Inventor
John E. Canning.
By [signature]
Attorney

UNITED STATES PATENT OFFICE.

JOHN E. CANNING, OF DENVER, COLORADO.

TOOTH-REGULATING DEVICE.

1,202,797. Specification of Letters Patent. Patented Oct. 31, 1916.

Application filed March 14, 1916. Serial No. 84,055.

*To all whom it may concern:*

Be it known that I, JOHN E. CANNING, a citizen of the United States, residing in the city and county of Denver and State of Colorado, have invented certain new and useful Improvements in Tooth-Regulating Devices; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a construction whereby coöperating screw threaded members are formed from spiral springs, the convolutions of the male member being so arranged as to form exterior screw threads, which coöperate with the interior threads formed by the convolutions of the female member, the latter being also equipped with exterior screw threads to which nuts may be applied in the same manner as upon an exteriorly threaded solid bolt. Devices of this character are particularly advantageous in connection with or as a part of tooth regulating devices, since the male member of the two coöperating parts, may constitute the arch of the tooth regulator, and, therefore, yield longitudinally as the ligature connected with the tooth is applied thereto. In applying the ligature and connecting it with the spiral spring arch, the latter is bent inwardly toward the tooth, and thus placed under tension, which tension is constant and active continuously for the purpose of straightening the tooth or bringing it into its normal position with reference to the other teeth. Again, the female member may constitute the bolt with which the anchoring band or bands are connected. It must be understood, however, that my improvement may be employed in other relations, though the use which will be given special attention in this application is in connection with tooth regulating devices in the relation heretofore outlined.

Having briefly set forth my improvement, as well as the function it is intended to perform, I will proceed to describe the same in detail, reference being made to the accompanying drawing, in which is illustrated an embodiment thereof.

Figure 1:
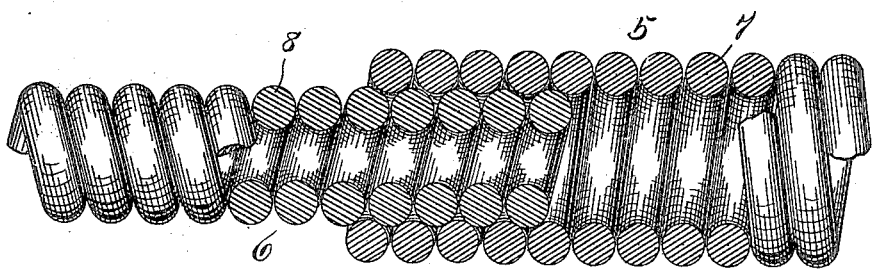
Figure 2:
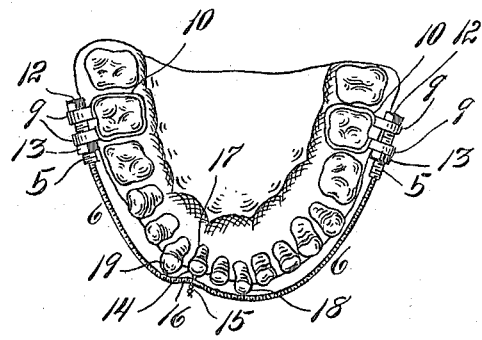

In this drawing, Figure 1 is a view partly in elevation and partly in longitudinal section disclosing my improvement. Fig. 2 is a view of a tooth regulator showing the same applied in the usual manner for tooth regulating purposes, and in which my improvement is employed, the same being shown on a much smaller scale.

The same reference characters indicate the same parts in all the views.

Let the numeral 5 designate the exterior or female member, and 6 the interior or male member of my improved device. The member 5 consists of a series of convolutions 7 composed of spring wire and so wound or coiled as to form both interior and exterior screw threads. The member 6 is composed of a series of convolutions 8 formed from spring wire so wound that an exterior screw thread is formed arranged to coöperate with the interior threads of the member 5. By virtue of this construction, the two members may be adjusted longitudinally by virtue of their coöperating screw threads, both members being yieldable longitudinally as circumstances may require. It is evident that the member 6 also has interior screw threads which may coöperate or not as may be required or desired, with a smaller exteriorly screw threaded part, the latter being either solid or formed of a spiral spring.

One of the uses to which my present improvement may be applied, is in connection with the practice of orthodontia in which is included the so-called straightening of teeth, or the movement or adjustment of certain teeth which have come to occupy abnormal positions with reference to the other teeth. In the construction illustrated in the drawing, the arch of the tooth regulating device is composed of the male member 6 of my improvement, while the bolts which engage the sleeves 9 of the anchor bands 10, are composed of female members 5. As illustrated, one extremity of each bolt 5 is exteriorly equipped with a head 12 which is polygonal in cross section, making it practicable to apply a wrench or other suitable device whereby the bolt may be turned for purposes of adjustment. This head 12 is in engagement with the rearmost sleeve 9 or the sleeve which is farthest back in the mouth when the device is in use. To the extremity of the bolt remote from the head, is applied a lock nut 13, which when the bolt is properly adjusted for regulating the arch 6 longitudinally or placing it under the required tension, is then screwed upon the bolt 5 into engagement with the adjacent sleeve 9 of the anchor band. If further regulation or longitudinal adjustment of the arch is required, the nut 13 will be turned upon the bolt to cause it to move away from the sleeve 9, in order to permit the further stretching of the arch. In this particular use of the device, it is evident that the bolt 5 must turn freely within both sleeves 9. In other words, neither of these sleeves is interiorly threaded, but are arranged to slide freely upon the bolt, the nut 13 being employed for properly tightening the anchor band upon the tooth, by screwing the nut against the forward sleeve, while the other sleeve is in engagement with the head 12 which forms a stop.

When the arch 6 is placed under proper tension, it is evident that as a ligature 14 is connected therewith as shown at 15, the arch may be bent inwardly toward the tooth as shown at 16. In this event, the tooth 17 may be in the normal position, while two teeth 18 and 19 may project outwardly too far, and in this case the arch 6 acts upon the teeth 18 and 19 actively and continuously for straightening purposes, this action being exerted to move the teeth 18 and 19 into proper position or alinement with reference to the other teeth. In this event it is evident that the spiral spring arch is under tension and is continuously pressing upon the teeth 18 and 19 in a sense different from what would be the case, if the arch 6 were composed of the usual solid wire, having no longitudinal resilience or not being longitudinally yieldable as in the case of the spiral spring arch. Furthermore, each bolt 5 is also yieldable longitudinally, and, as the nut 13 is tightened, may yield, whereby the bolt is placed under longitudinal tension which is exerted to hold the nut tightly against its adjacent sleeve to prevent accidental loosening or unscrewing.

Having thus described my invention, what I claim is,—

1. In a tooth regulating device, the combination of an arch band and an anchor band bolt respectively provided with interthreading spiral spring members.

2. A tooth regulating device including a hollow interiorly and exteriorly threaded bolt, and an exteriorly threaded arch, the two members being respectively composed of spiral springs, the exterior threads of the arch coöperating with the interior threads of the bolt.

3. A tooth regulating device including a hollow interiorly and exteriorly threaded bolt, and an exteriorly threaded arch, the two members being respectively composed of spiral springs, the exterior threads of the arch coöperating with the interior threads of the bolt, the said bolt having a head at one extremity and an adjusting nut at its opposite extremity.

In testimony whereof I affix my signature, in presence of two witnesses.

JOHN E. CANNING.

Witnesses:
GRACE HUSTON,
A. EBERT O'BRIEN.

Copies of this patent may be obtained for five cents each, by addressing the "Commissioner of Patents, Washington, D. C."